United States Patent
Barauna

(10) Patent No.: US 9,768,617 B2
(45) Date of Patent: Sep. 19, 2017

(54) POWER MANAGEMENT SYSTEM COMPRISING A POWER SOURCE, A SOURCE OF RENEWABLE ENERGY, AND A POWER CONVERTER

(75) Inventor: Allan Pierre Barauna, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 789 days.

(21) Appl. No.: 14/118,398

(22) PCT Filed: Jun. 14, 2012

(86) PCT No.: PCT/EP2012/061285
§ 371 (c)(1),
(2), (4) Date: Nov. 18, 2013

(87) PCT Pub. No.: WO2013/000721
PCT Pub. Date: Jan. 3, 2013

(65) Prior Publication Data
US 2014/0084694 A1    Mar. 27, 2014

(30) Foreign Application Priority Data
Jun. 28, 2011    (FR) ...................... 11 55723

(51) Int. Cl.
*H02J 3/00*      (2006.01)
*H02M 1/10*      (2006.01)
(Continued)

(52) U.S. Cl.
CPC ............. *H02J 4/00* (2013.01); *B60L 11/1812* (2013.01); *B60L 11/1816* (2013.01);
(Continued)

(58) Field of Classification Search
USPC ........................................... 307/29; 320/109
See application file for complete search history.

(56) References Cited

U.S. PATENT DOCUMENTS

| 5,315,227 A | 5/1994 | Pierson et al. |
| 2010/0017045 A1* | 1/2010 | Nesler ................. B60L 11/1824 700/296 |

(Continued)

FOREIGN PATENT DOCUMENTS

| WO | 2010 030957 | 3/2010 |
| WO | 2011 019855 | 2/2011 |

OTHER PUBLICATIONS

International Search Report Issued Apr. 9, 2013 in PCT/EP12/061285 Filed Jun. 14, 2012.

*Primary Examiner* — Rexford Barnie
*Assistant Examiner* — Dru Parries
(74) *Attorney, Agent, or Firm* — Oblon, McClelland, Maier & Neustadt, L.L.P.

(57) ABSTRACT

The invention relates to a power management system, comprising: a power source; a source of renewable energy; a power converter; a first selection means arranged to connect the input of the power converter either to the power source or to the source of renewable energy; a second selection means arranged to connect the outlet of the power converter either to the power source or to a system for storing power; and a means for synchronizing the first selection means and the second selection means, which operates according to pre-established operation rules.

8 Claims, 1 Drawing Sheet

(51) Int. Cl.
*H02J 7/00* (2006.01)
*H02J 4/00* (2006.01)
*B60L 11/18* (2006.01)
*H02J 7/35* (2006.01)
*H02J 7/02* (2016.01)

(52) U.S. Cl.
CPC .............. *H02J 7/0055* (2013.01); *H02J 7/35* (2013.01); *B60L 2230/22* (2013.01); *B60L 2230/24* (2013.01); *H02J 7/022* (2013.01); *Y02E 10/766* (2013.01); *Y02T 10/7005* (2013.01); *Y02T 10/7094* (2013.01); *Y02T 10/92* (2013.01); *Y02T 90/127* (2013.01); *Y02T 90/14* (2013.01); *Y02T 90/168* (2013.01); *Y04S 30/12* (2013.01); *Y10T 307/696* (2015.04)

(56) References Cited

U.S. PATENT DOCUMENTS

| | | |
|---|---|---|
| 2010/0231173 A1 | 9/2010 | Andrea et al. |
| 2011/0055037 A1 | 3/2011 | Hayashigawa et al. |
| 2011/0298422 A1* | 12/2011 | Failing ............... B60L 3/00 320/109 |
| 2012/0176090 A1 | 7/2012 | Andrea et al. |
| 2013/0049689 A1 | 2/2013 | Hayashigawa et al. |

* cited by examiner

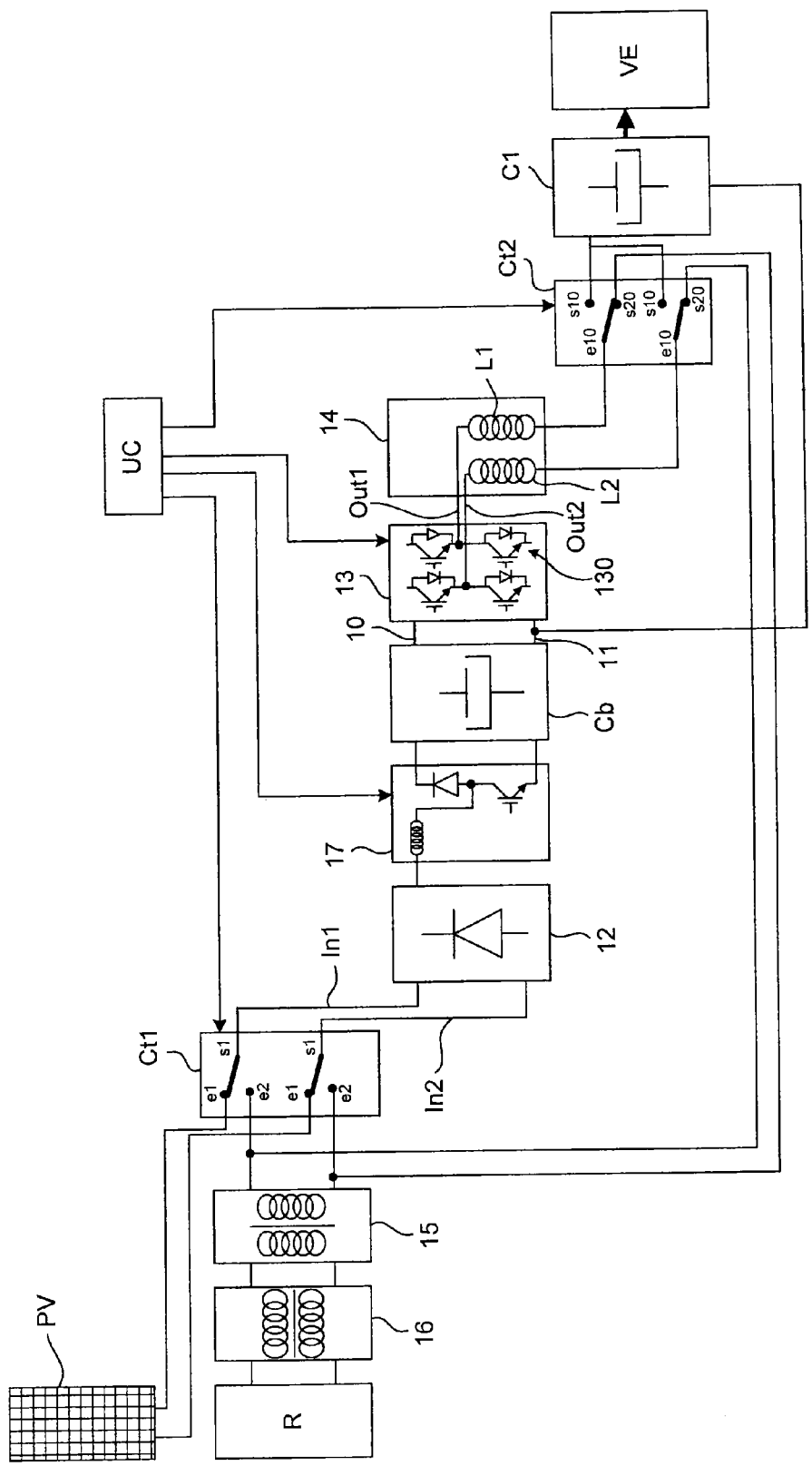

POWER MANAGEMENT SYSTEM COMPRISING A POWER SOURCE, A SOURCE OF RENEWABLE ENERGY, AND A POWER CONVERTER

TECHNICAL FIELD OF THE INVENTION

The present invention pertains to an electrical energy management system comprising an electrical supply source, such as for example the electrical distribution network, a renewable energy source, such as for example photovoltaic panels, a power converter and an electrical energy accumulation system, such as for example batteries of an electric vehicle.

PRIOR ART

In a residence connected both to a so-called conventional electrical supply source, that is to say an electrical distribution network, and to a renewable energy source such as photovoltaic panels, and equipped with a terminal for recharging an electric vehicle, a first converter is required in order to convert the electrical energy provided by the photovoltaic panels so as to inject it onto the electrical distribution network and a second converter is required in order to convert the electrical energy originating from the electrical distribution network so as to recharge the batteries of an electric vehicle plugged into a suitable electric socket. The use of two distinct converters to fulfill the two functions turns out to be a particularly cumbersome solution. Moreover, the two converters must be specifically configured for the realization of their function.

The aim of the invention is therefore to propose a control system making it possible to manage electrical distribution between a conventional electrical supply source, such as for example an electrical distribution network, a renewable energy source, such as for example photovoltaic panels, and an energy accumulation system such as for example the batteries of an electric vehicle, said control system being simple, reliable, compact and realizable on the basis of standard components.

DISCLOSURE OF THE INVENTION

This aim is achieved by an electrical energy management system comprising:
  an electrical supply source,
  a renewable energy source,
  a power converter comprising an input, a rectifier module connected to said input, a DC supply bus connected to the rectifier module, an inverter module connected to the DC supply bus and an output connected to the inverter module,
  characterized in that:
  the electrical supply source and the renewable energy source are connected in parallel to the input of the power converter,
  the system comprises first selection means designed to connect the input of the power converter, either to the electrical supply source, or to the renewable energy source,
  the system comprises second selection means designed to connect the output of the power converter either to the electrical supply source, or to an electrical energy accumulation system,
  the system comprises means for synchronizing the first selection means and second selection means operating according to pre-established operating rules.

According to a particular feature, the first selection means comprise a first contactor and the second selection means comprise a second contactor.

Advantageously, the system comprises an output filter connected to the output of the converter and to the second contactor.

Advantageously, the system comprises a transformer connected to the first contactor and an input filter connected to the transformer and to the electrical supply source.

Advantageously, the system comprises a converter of "boost" type connected between the rectifier module and the DC supply bus.

According to the invention, the electrical supply source is the electrical distribution network.

According to the invention, the renewable energy source consists of photovoltaic panels or of at least one wind turbine.

According to the invention, the energy accumulation system consists of the batteries of an electric vehicle.

BRIEF DESCRIPTION OF THE FIGURES

Other characteristics and advantages will become apparent in the detailed description which follows while referring to an embodiment given by way of example and represented by the appended drawings in which FIG. 1 represents the energy management system according to the invention.

DETAILED DESCRIPTION OF AT LEAST ONE EMBODIMENT

The electrical energy management system of the invention comprises a conventional electrical supply source, for example the electrical distribution network R, a renewable energy source, for example photovoltaic panels PV or a wind turbine, and makes it possible to offer various operating configurations in a residence equipped with an electric socket intended to be connected to an electrical energy accumulation system such as for example the batteries of an electric vehicle VE.

In the subsequent description, it will be considered that the electrical supply source is the electrical distribution network R, that the renewable energy source consists of photovoltaic panels PV and that the electrical energy accumulation system is formed by the batteries of an electric vehicle VE. On the basis of these various constituents, the various operating configurations are as follows:
  the electrical distribution network R can be connected to the batteries of the electric vehicle VE to recharge them,
  the photovoltaic panels PV can be connected to the electrical distribution network R to reinject the electrical energy produced onto the network,
  the photovoltaic panels PV can be connected to the batteries of the electric vehicle VE to recharge them.

These three operating configurations can be obtained by the electrical energy management system of the invention. The electrical energy management system of the invention accordingly comprises a common power converter used both to manage the charging of the batteries of the electric vehicle originating from the network or of the photovoltaic panels or to reinject the energy provided by the photovoltaic panels. The power converter is thus employed:

in charger mode, when the photovoltaic panels or the electrical distribution network are employed to charge the batteries of the electric vehicle or, in energy regeneration mode, when the photovoltaic panels PV reinject the electrical energy produced into the electrical distribution network R.

By default, the system is for example in a charger mode in which the electrical distribution network is connected to the socket for recharging the electric vehicle, with a view to recharging its batteries when the vehicle is plugged in.

With reference to FIG. 1, a power converter comprises:

An input comprising at least two input lines In1, In2.

A rectifier module 12 connected to the input and intended to rectify an AC voltage. This rectifier module 12 advantageously uses diodes which are more economical and more reliable than thyristors. This rectified voltage can be filtered to obtain a DC voltage.

A DC supply bus connected to the rectifier module and composed of a positive line 10 and of a negative line 11, on which lines the DC voltage can be applied.

A bus capacitor Cb customarily used to keep the voltage Vdc of the DC supply bus constant. This bus capacitor Cb is connected between the positive line 10 and the negative line 11 of the bus.

An inverter module 13 connected at the output of the DC supply bus. In charger mode, the inverter module 13 fulfills the function of synchronized "buck" converter and makes it possible to control the charging of the accumulation system of the electric vehicle VE in current-source mode. In energy regeneration mode, the inverter module 13 is employed as active rectifier making it possible to reinject the electrical energy produced by the photovoltaic panels PV onto the electrical distribution network R. The inverter module 13 accordingly comprises electronic power breakers 130 mounted on each phase to which a command is applied by Pulse Width Modulation (PWM). These breakers are power transistors, for example of IGBT type, controlled by a control unit carrying out the PWM. In FIG. 1, the inverter module 13 comprises two switching arms, each switching arm being equipped with two power transistors 130 in series between the positive line and the negative line of the DC supply bus.

An output connected to the inverter module and composed of at least two output lines Out1, Out2 each connected to a midpoint formed on each switching arm of the inverter module 13.

The system of the invention also comprises first selection means connected to the input of the power converter and intended to connect the input of the power converter either to the photovoltaic panels PV, or to the electrical distribution network R.

The system also comprises second selection means connected to the output of the power converter and intended to connect the output of the power converter, either to the electrical distribution network R, or to the batteries of the electric vehicle VE.

Advantageously, the first selection means comprises a first electromechanical contactor Ct1 controlled by a first control signal and the second selection means comprise a second electromechanical contactor Ct2 controlled by a second control signal, synchronized with the first control signal according to pre-established operating rules, for example stored in a control unit UC and selected with a view to obtaining the various aforementioned operating configurations. The first contactor Ct1 comprises two first inputs e1 connected to the photovoltaic panels PV and two second inputs e2 connected to the electrical distribution network R. The first contactor Ct1 comprises two outputs s1 connected to the two input lines In1, In2 of the power converter. The second contactor Ct2 comprises two inputs e10 connected to the two output lines Out1, Out2 of the power converter, two first outputs s10 intended to be connected to the batteries of the electric vehicle VE when the latter is plugged in and two second outputs s20 connected to the electrical distribution network R.

Advantageously, the electrical energy management system also comprises an output filter 14 composed of two inductors L1, L2 each connected on the one hand to an output line Out1, Out2 of the power converter and on the other hand to a distinct input e10 of the second contactor Ct2 and of a capacitor C1 connected on the one hand to the first outputs s10 of the second contactor Ct2 and on the other hand to the negative line 11 of the DC supply bus. In charger mode, the output filter composed of the two inductors L1, L2 and of the capacitor is employed, in company with the inverter module, to form the converter of synchronized "buck" type. In energy regeneration mode, the two inductors L1, L2 of the output filter 14 are employed as inductors of "boost" type.

Advantageously, the electrical energy management system also comprises a transformer 15 whose secondary is connected to the two second inputs e2 of the first contactor Ct1 and an EMC (Electromagnetic Compatibility) filter 16 connected on the one hand to the primary of said transformer 15 and on the other hand to the electrical distribution network R. The transformer 15 is employed to carry out galvanic insulation of the power converter with respect to the electrical distribution network R. The EMC filter 16 is employed and rated so as to fulfill the standards in regard to electromagnetic compatibility.

Advantageously, the electrical energy management system of the invention comprises a converter 17 of "boost" type composed of a switching arm connected to the two power supply lines 10, 11 of the DC supply bus and an inductor connected on the one hand to the midpoint of said switching arm and on the other hand in series with a power supply line of the DC supply bus. The switching arm of the "boost" converter will be able to be one of the switching arms of an inverter module with three-phase output, employed in a standard variable speed drive. The converter 17 of "boost" type has a dual function. In energy regeneration mode, it makes it possible to increase the voltage on the DC supply bus. In charger mode, it forms a current source so as to reduce the harmonics of the input current.

The aforementioned operating rules are for example as follows:

If the electric vehicle VE is plugged into the socket intended for the recharging of its batteries and if the energy produced by virtue of the photovoltaic panels PV is sufficient, the batteries of the electric vehicle VE are connected to the photovoltaic panels PV. The first contactor Ct1 is controlled by the control unit UC in such a way that its two first inputs e1 are then connected to its two outputs s2 and the second contactor Ct2 is controlled by the control unit UC in such a way that its two inputs e10 are connected to its two first outputs s10.

If the electric vehicle VE is plugged into the socket intended for the recharging of its batteries and if the electrical energy produced by virtue of the photovoltaic panels PV is insufficient, the batteries of the electric vehicle VE are connected to the electrical distribution network R. The first contactor Ct1 is then controlled by the control unit UC in such a way that its two second inputs e2 are connected to its two outputs s1 and the second contactor Ct2 is controlled by the control unit UC in such a way that its two inputs e10 are connected to its two first outputs s10.

If the electric vehicle VE is not plugged in and if it is daytime, the system is then in energy regeneration mode in which the photovoltaic panels PV are connected to the electrical distribution network R. Accordingly, the first contactor Ct1 is controlled by the control unit UC in such a way that its two first inputs e1 are connected to its two outputs s1 and the second contactor Ct2 is controlled by the control unit UC in such a way that its two inputs e10 are connected to its two second outputs s20. If the electric vehicle VE is not plugged in and if it is nighttime, the system can remain in energy regeneration mode.

The quantity of energy produced by virtue of the photovoltaic panels PV can be determined by measuring the voltage delivered by the panels, or by employing a clock on the basis of which are defined operating time slots.

According to the invention, the system can comprise a sensor making it possible to detect whether or not the electric vehicle is plugged into its recharging socket.

According to the invention, as a function of the operating rule chosen, the control unit UC dispatches, by virtue of synchronization means, control signals to the first and second contactors Ct1, Ct2 so as to select the connection of the input of the power converter and its output and optionally to the switching arm of the converter 17 if the latter is present. Moreover, as a function of the operating rule selected, the control unit UC applies the suitable command to the electronic power breakers of the inverter module 13 so as to operate the inverter module 13 as synchronized "buck" converter or as active rectifier.

The invention claimed is:

1. An electrical energy management system comprising:
   an electrical supply source,
   a renewable enemy source,
   an electrical energy accumulation system comprising a battery,
   a power converter comprising an input, a rectifier connected to said input, a DC supply bus connected to the rectifier, an inverter connected to the DC supply bus and an output connected to the inverter, wherein the electrical supply source and the renewable energy source are connected in parallel to the input of the power converter,
   a first selection switch configured to connect the input of the power converter, either to the electrical supply source, or to the renewable energy source,
   a second selection switch configured to connect the output of the power converter either to the electrical supply source, or to the electrical energy accumulation system, and
   circuitry configured to synchronize the first selection switch and second selection switch operating according to pre-established operating rules, the rules comprising:
   if the electrical energy accumulation system is connected to the electrical energy management system and the renewable energy source produces sufficient energy to charge the electrical energy accumulation system, connecting the renewable energy source to the electrical energy accumulation system;
   if the electrical energy accumulation system is connected to the electrical energy management system and the renewable energy source does not produce sufficient energy to charge the electrical energy accumulation system, connecting the electrical supply source to the electrical energy accumulation system; and
   in response to a detection that the electrical energy accumulation system is not connected to the electrical energy management system, connecting the renewable energy source to the electrical supply source.

2. The system as claimed in claim 1, wherein the first selection switch comprises a first contactor and the second selection switch comprises a second contactor.

3. The system as claimed in claim 2, further comprising an output filter connected to the output of the converter and to the second contactor.

4. The system as claimed in claim 1, further comprising a transformer connected to the first contactor and an input filter connected to the transformer and to the electrical supply source.

5. The system as claimed in claim 1, further comprising a converter of "boost" type connected between the rectifier module and the DC supply bus.

6. The system as claimed in claim 1, wherein the electrical supply source is an electrical distribution network.

7. The system as claimed in claim 1, wherein the renewable energy source comprises photovoltaic panels or at least one wind turbine.

8. The system as claimed in claim 1, wherein the energy accumulation system comprises batteries of an electric vehicle.

* * * * *